US012607488B2

(12) United States Patent
Agehara et al.

(10) Patent No.: US 12,607,488 B2
(45) Date of Patent: *Apr. 21, 2026

(54) LIGHT RECEIVING ELEMENT, AND ROTATION DETECTOR

(71) Applicant: Panasonic Intellectual Property Management Co., Ltd., Osaka (JP)

(72) Inventors: Akio Agehara, Osaka (JP); Kenji Furumai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 303 days.

This patent is subject to a terminal disclaimer.

(21) Appl. No.: 18/567,007

(22) PCT Filed: May 17, 2022

(86) PCT No.: PCT/JP2022/020501
§ 371 (c)(1),
(2) Date: Dec. 4, 2023

(87) PCT Pub. No.: WO2022/264734
PCT Pub. Date: Dec. 22, 2022

(65) Prior Publication Data
US 2024/0271967 A1 Aug. 15, 2024

(30) Foreign Application Priority Data
Jun. 18, 2021 (JP) ................................. 2021-101417

(51) Int. Cl.
*G01D 5/26* (2006.01)
*G01B 11/26* (2006.01)

(52) U.S. Cl.
CPC ............. *G01D 5/264* (2013.01); *G01B 11/26* (2013.01)

(58) Field of Classification Search
CPC ..... G01B 11/26; G01D 5/264; G01D 5/34715
(Continued)

(56) References Cited

U.S. PATENT DOCUMENTS

| | | | |
|---|---|---|---|
| 2002/0014581 A1* | 2/2002 | Yamamoto | G01D 5/34715 250/231.13 |
| 2007/0138382 A1 | 6/2007 | Matsuyama | |

(Continued)

FOREIGN PATENT DOCUMENTS

| | | |
|---|---|---|
| JP | 2005-121593 A | 5/2005 |
| JP | 4273442 B2 | 6/2009 |

(Continued)

OTHER PUBLICATIONS

International Search Report of PCT application No. PCT/JP2022/020501 dated Jul. 12, 2022.
(Continued)

*Primary Examiner* — Sunghee Y Gray
(74) *Attorney, Agent, or Firm* — Rimon P.C.

(57) ABSTRACT

For a light receiving element, signal distortion is suppressed, and an unnecessary space is reduced. The light receiving element includes a plurality of light receiver groups (21g) arranged in an arrangement direction at a predetermined arrangement interval. Light receiver groups (21g) include first light receiver (211) and second light receiver (212). First light receiver (211) has a first main phase portion and a first sub-phase portion having a width of ⅓ of the arrangement interval. First light receiver (211) is separated into first main body portion (211a) and first separation portion (211b) each having a width in the arrangement direction of less than ¼ of the arrangement interval. Second light receiver (212) is separated into second main body portion (212a) and second separation portion (212b) each having a width in the arrangement direction of less than ¼
(Continued)

of the arrangement interval. First main body portion (211*a*) and second main body portion (212*a*) are arranged in the arrangement direction, and first separation portion (211*b*) and second separation portion (212*b*) are arranged in the arrangement direction.

10 Claims, 8 Drawing Sheets

(58) Field of Classification Search
USPC ........................................................ 356/138
See application file for complete search history.

(56) References Cited

U.S. PATENT DOCUMENTS

| | | | | |
|---|---|---|---|---|
| 2015/0122982 | A1* | 5/2015 | Yoshida | G01D 5/3473 |
| | | | | 250/231.13 |
| 2016/0161295 | A1 | 6/2016 | Uemura et al. | |
| 2018/0299300 | A1* | 10/2018 | Kimura | G01D 5/34715 |
| 2019/0376817 | A1 | 12/2019 | Fukuda et al. | |
| 2021/0018890 | A1 | 1/2021 | Takada et al. | |
| 2024/0271968 | A1* | 8/2024 | Furumai | G01D 5/3473 |

FOREIGN PATENT DOCUMENTS

| | | | |
|---|---|---|---|
| JP | 2015-090300 | A | 5/2015 |
| JP | 2015-090303 | A | 5/2015 |
| JP | 5927482 | B | 6/2016 |

OTHER PUBLICATIONS

International Search Report of PCT application No. PCT/JP2022/020502 dated Aug. 2, 2022.
Non-Final Office Action dated Nov. 20, 2025 issued in related U.S. Appl. No. 18/568,812.

* cited by examiner

LIGHT RECEIVING ELEMENT, AND ROTATION DETECTOR

TECHNICAL FIELD

The present disclosure relates to a light receiving element and a rotation detector.

BACKGROUND ART

Conventionally, in a rotation detector or a linear displacement detector, a configuration using an optical means including a light emitter, a light receiving element, and the like is known. For example, in the rotation detector described in Patent Literature 1, an incremental pattern light receiver is formed by combining a photoelectric conversion element and a slit in order to improve resolution.

In addition, in the detector described in Patent Literature 1, the width of the slit is set to ⅓ of the slit interval, and two slits having such a width are disposed to be shifted from each other by 1/12 of the slit interval. Accordingly, it is intended to suppress signal distortion (deviation from the sine wave) obtained in the incremental light receiver.

CITATION LIST

Patent Literature

PTL 1: Japanese Patent No. 5927482

SUMMARY OF THE INVENTION

In the detector described in Patent Literature 1, the maximum width of the slit is 5/12 of the slit interval and is larger than ¼ of the slit interval. Therefore, in a case where the detector receives two signals having a phase difference of 90 degrees corresponding to ¼ of the slit interval and two slits respectively corresponding to the two signals are disposed at an interval of ¼ of the slit interval, the two slits interfere with each other. For this reason, it is necessary to dispose the two slits at a interval larger than ¼ of the slit interval (for example, a interval of 5/4 of the slit interval). Accordingly, an unnecessary space is generated between the two slits. Therefore, there may be a case where a sufficient number of slits cannot be disposed in the predetermined space.

The present disclosure has been made to solve such a problem, and an object of the present disclosure is to provide a light receiving element capable of suppressing signal distortion and reducing unnecessary space, and a rotation detector including the light receiving element.

One aspect of the light receiving element according to the present disclosure is a light receiving element including a plurality of light receiver groups arranged in a predetermined arrangement direction at a predetermined arrangement interval. Each of the plurality of light receiver groups includes a first light receiver and a second light receiver disposed at a position shifted by ¼ of the arrangement interval in the arrangement direction with respect to the first light receiver. The first light receiver includes a first main phase portion and a first sub-phase portion. The first main phase portion has a width of ⅓ of the arrangement interval in the arrangement direction. The first sub-phase portion has a width of ⅓ of the arrangement interval in the arrangement direction. In addition, the first sub-phase portion is disposed at a position shifted in the arrangement direction by 1/12 of the arrangement interval with respect to the first main phase portion, the position being adjacent to the first main phase portion in a perpendicular direction perpendicular to the arrangement direction. The second light receiver includes a second main phase portion and a second sub-phase portion. The second main phase portion has a width of ⅓ of the arrangement interval in the arrangement direction. The second sub-phase portion has a width of ⅓ of the arrangement interval in the arrangement direction. In addition, the second sub-phase portion is disposed at a position shifted in the arrangement direction by 1/12 of the arrangement interval with respect to the second main phase portion, the position being adjacent to the second main phase portion in the perpendicular direction. The first light receiver is separated into the first main body portion and the first separation portion each having a width in the arrangement direction of less than ¼ of the arrangement interval. The first main body portion and the first separation portion are disposed separately from each other in the perpendicular direction. The second light receiver is separated into the second main body portion and the second separation portion each having a width in the arrangement direction of less than ¼ of the arrangement interval. The second main body portion and the second separation portion are disposed separately from each other in the perpendicular direction. The first main body portion and the second main body portion are arranged in the arrangement direction, and a gap between the first main body portion and the second main body portion is less than ¼ of the arrangement interval. The first separation portion and the second separation portion are arranged in the arrangement direction, and a gap between the first separation portion and the second separation portion is less than ¼ of the arrangement interval.

One aspect of a rotation detector according to the present disclosure includes: the light receiving element; a light emitter that emits light; and a rotation plate disposed at a position facing the light receiving element, the light being emitted to the plurality of light receiver groups via the rotation plate.

According to the present disclosure, it is possible to realize a light receiving element and a rotation detector capable of suppressing signal distortion and reducing unnecessary space.

DESCRIPTION OF EMBODIMENTS

Exemplary embodiments of the present disclosure will be described below with reference to the drawings. Note that, each of the exemplary embodiments described below illustrates one specific example of the present disclosure. Thus, the numerical values, shapes, materials, components, disposed positions and connection forms of the components, and the like shown in the following exemplary embodiment are examples, and are not intended to limit the present disclosure. Thus, among the constituent elements in the following exemplary embodiments, constituent elements that are not described in independent claims indicating the highest concept of the present disclosure are described as optional constituent elements.

Note that each of the drawings is a schematic diagram and not necessarily illustrated exactly. In addition, in each drawing, substantially identical components are denoted by identical reference signs and repetitive explanations thereof will be omitted or simplified.

First Exemplary Embodiment

A light receiving element and a rotation detector according to a first exemplary embodiment will be described.

[1-1. Overall Configuration]

First, an overall configuration of a light receiving element and a rotation detector according to the present exemplary embodiment will be described with reference to FIG. 1.

Figure 1:
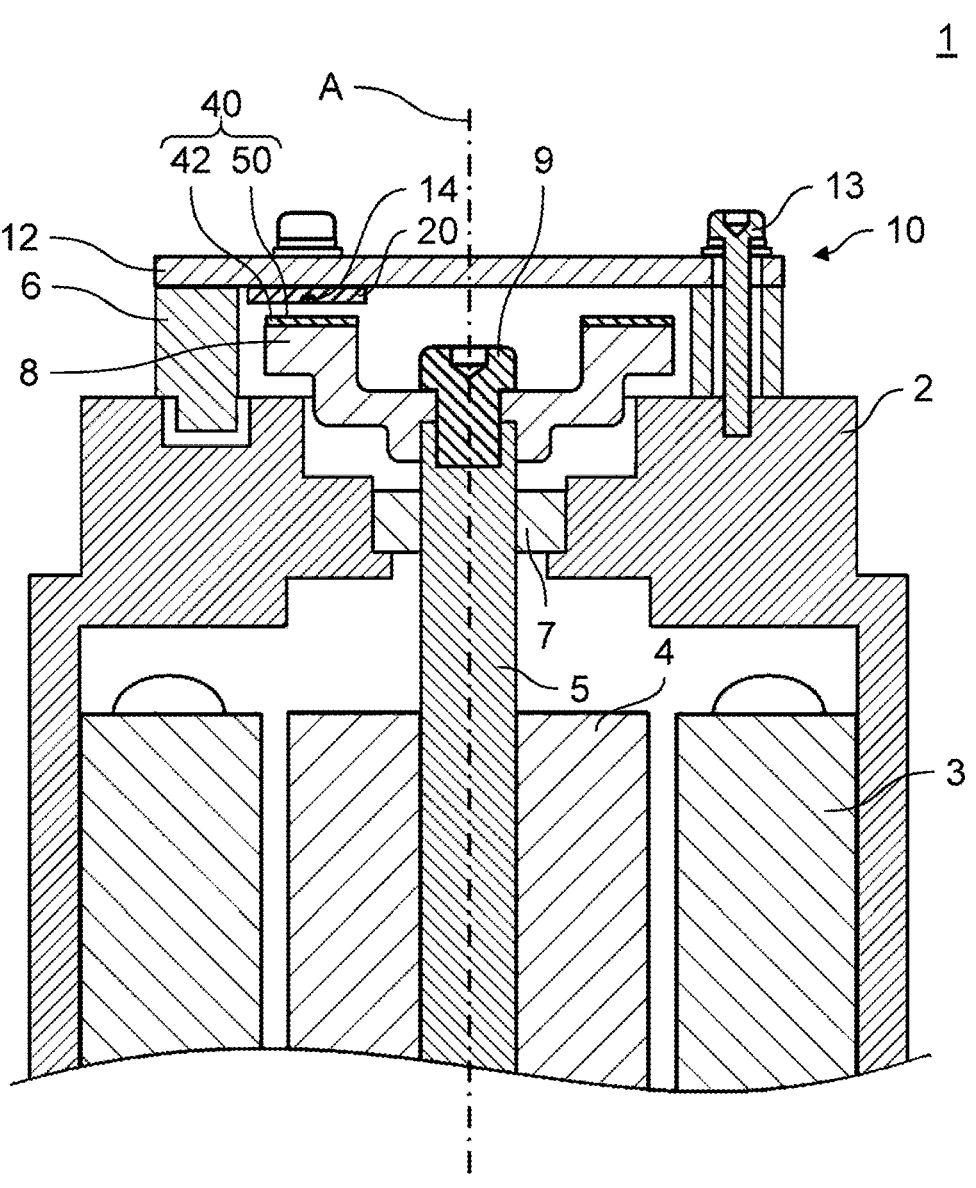
FIG. 1 is a sectional view illustrating an electric motor including a rotation detector according to a first exemplary embodiment.

FIG. 1 is a sectional view illustrating electric motor 1 including rotation detector 10 according to the present exemplary embodiment. FIG. 1 illustrates a cross section passing through rotary axis line A of electric motor 1.

As illustrated in FIG. 1, electric motor 1 mainly includes motor frame 2, stator 3, rotor 4, rotary shaft 5, bearing 7, and rotation detector 10.

Motor frame 2 is a housing that houses stator 3, rotor 4, and the like. Stator 3 is fixed to the inner surface of motor frame 2. Rotor 4 is provided in motor frame 2 via bearing 7 so as to be rotatable with respect to stator 3.

Rotary shaft 5 is a rod-like member, is fixed to the inner surface of rotor 4, and rotates about rotary axis line A. Rotary shaft 5 is rotatably fixed to motor frame 2 via bearing 7. For example, when electric power is supplied to electric motor 1, rotary shaft 5 rotates about rotary axis line A as a rotation center together with rotor 4 on the basis of the electric power. Rotation detector 10 is provided at one end of rotary shaft 5 in the axial direction. A load (not illustrated) rotationally driven due to the rotation of rotary shaft 5 is attached to the other end of rotary shaft 5 in the axial direction. For example, rotary shaft 5 is made of a magnetic metal such as iron.

Bearing 7 is a member that is fixed to motor frame 2 and rotatably supports rotary shaft 5 with respect to motor frame 2. In FIG. 1, bearing 7 is disposed near one end of rotary shaft 5, but a bearing may also be disposed near the other end of rotary shaft 5.

Rotation detector 10 detects rotation of a detection target. Specifically, rotation detector 10 detects a position (rotational position) of the detection target, a rotation direction of the detection target, a rotation speed of the detection target, and the like. In the present exemplary embodiment, the detection target is rotary shaft 5. That is, rotation detector 10 detects the position of rotary shaft 5, the rotation direction of rotary shaft 5, the rotation speed of rotary shaft 5, and the like.

As described above, rotation detector 10 is provided at one end of rotary shaft 5. Rotation detector 10 includes light receiving element 20, light emitter 14, and rotation plate 40. In the present exemplary embodiment, rotation detector 10 further includes substrate 12, frame 6, boss 8, bolt 9, and screw 13.

Frame 6 is a tubular member attached to motor frame 2 so as to cover one end of rotary shaft 5 in the axial direction, rotation plate 40, and the like. In the present exemplary embodiment, frame 6 is fixed to motor frame 2 together with substrate 12 by screws 13.

Rotation plate 40 is a plate that is fixed to rotary shaft 5 via boss 8 and rotates about rotary axis line A as a rotation center, and includes main body 42 and pattern portion 50. Main body 42 has a plate shape whose thickness direction is a direction along rotary axis line A. In addition, main body 42 has an annular shape when viewed from a direction along rotary axis line A. Main body 42 is attached to one end of rotary shaft 5 in the axis line direction, and rotates about rotary axis line A as a rotation center together with rotary shaft 5. The shaft center of main body 42 coincides with rotary axis line A.

Pattern portion 50 is a light modulator disposed on a path of light propagating from light emitter 14 to light receiving element 20 (that is, optical path). In the present exemplary embodiment, pattern portion 50 is disposed between the end edge of main body 42 and rotary axis line A at a position facing light emitter 14 and light receiving element 20. In pattern portion 50, a light modulation pattern is formed on a circumference centered on rotary axis line A. In the present exemplary embodiment, in pattern portion 50, a portion having a high reflectance to light from light emitter 14 and a portion having a low reflectance are formed in a predetermined pattern. Rotation plate 40 is made of, for example, stainless steel, and a film having a low reflectance is formed on a low reflectance portion of pattern portion 50. A detailed configuration of pattern portion 50 will be described later.

Boss 8 is a member to which rotation plate 40 is fixed. In the present exemplary embodiment, a through hole is formed in the central portion of boss 8. Boss 8 is fixed to rotary shaft 5 by bolt 9 inserted into the through hole, and rotates about rotary axis line A as a rotation center together with rotary shaft 5.

Bolt 9 is a member that fixes boss 8 to rotary shaft 5. In the present exemplary embodiment, bolt 9 is a hexagon socket set bolt.

Substrate 12 is a plate-like member disposed at a position facing rotation plate 40 separately from rotation plate 40. Light receiving element 20 and light emitter 14 are disposed on a main surface of substrate 12 facing rotation plate 40. In the present exemplary embodiment, substrate 12 is fixed to motor frame 2 via frame 6 by screws 13.

Light emitter 14 is a light source that emits light. Light emitter 14 is disposed at a position facing pattern portion 50 of rotation plate 40. The configuration of light emitter 14 is not particularly limited as long as it can emit light. In the present exemplary embodiment, light emitter 14 is a light emitting diode and is disposed on substrate 12. More specifically, light emitter 14 is disposed on light receiving element 20 disposed on substrate 12. Light emitter 14 may be included in light receiving element 20. That is, light receiving element 20 may include light emitter 14.

Light receiving element 20 is an element that receives light from light emitter 14. Light from light emitter 14 is emitted to light receiving element 20 via rotation plate 40. In the present exemplary embodiment, light from light emitter 14 is reflected by pattern portion 50 of rotation plate 40, and is applied to light receiving element 20. A detailed configuration of light receiving element 20 will be described later.

[1-2. Configuration of Pattern Portion]

Figures 2, 3:
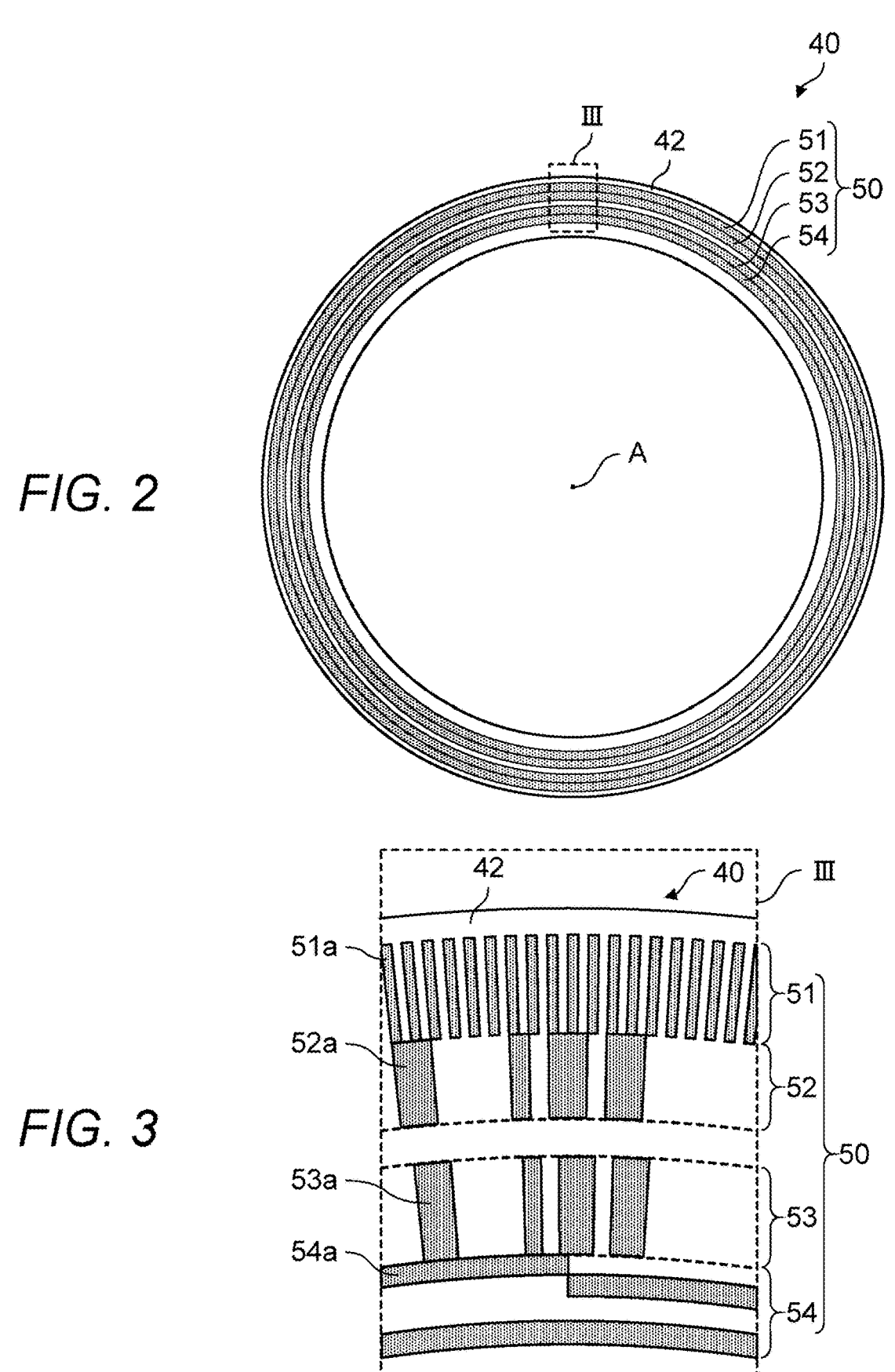
FIG. 2 is a plan view illustrating a rotation plate included in the rotation detector according to the first exemplary embodiment.
FIG. 3 is an enlarged view of a part of a pattern portion of the rotation plate included in the rotation detector according to the first exemplary embodiment.

A detailed configuration of pattern portion 50 of rotation plate 40 included in rotation detector 10 according to the present exemplary embodiment will be described with reference to FIGS. 2 and 3. FIG. 2 is a plan view illustrating rotation plate 40 included in rotation detector 10 according to the present exemplary embodiment. FIG. 2 is a plan view of a surface of rotation plate 40 facing light receiving element 20 as viewed from a direction along rotary axis line A. FIG. 3 is an enlarged view of a part of pattern portion 50 of rotation plate 40 included in rotation detector 10 according to the present exemplary embodiment. FIG. 3 is an enlarged view of the inside of broken-line frame III illustrated in FIG. 2.

As illustrated in FIGS. 2 and 3, pattern portion 50 is disposed on a surface of rotation plate 40 facing light receiving element 20. Pattern portion 50 is disposed on a circumference centered on rotary axis line A. In the present exemplary embodiment, pattern portion 50 includes first pattern portion 51, second pattern portion 52, third pattern portion 53, and fourth pattern portion 54. First pattern portion 51, second pattern portion 52, third pattern portion 53, and fourth pattern portion 54 are disposed in this order from an end edge side of rotation plate 40.

As illustrated in FIG. 3, first pattern portion 51 includes a plurality of low reflection regions 51a. The plurality of low reflection regions 51a are formed of, for example, a coating film having a low reflectance for light from light emitter 14. The plurality of low reflection regions 51a form an incremental pattern. The plurality of low reflection regions 51a have the same rectangular (or fan-like) shape and are arranged at equal intervals on the circumference centered on rotary axis line A. The number of the plurality of low reflection regions 51a is not particularly limited, but is 512 in the present exemplary embodiment.

Second pattern portion 52 includes a plurality of low reflection regions 52a. The plurality of low reflection regions 52a are formed of, for example, a coating film having a low reflectance for light from light emitter 14. The plurality of low reflection regions 52a form an absolute pattern. In the present exemplary embodiment, the plurality of low reflection regions 52a are randomly disposed on a circumference centered on rotary axis line A on rotation plate 40. Light receiving element 20 can specify the absolute position in the circumferential direction centered on rotary axis line A of rotation plate 40 by receiving the light from light emitter 14 modulated by the plurality of low reflection regions 52a.

Third pattern portion 53 includes a plurality of low reflection regions 53a. The plurality of low reflection regions 53a are formed of, for example, a coating film having a low reflectance for light from light emitter 14. The plurality of low reflection regions 53a form an absolute pattern. In the present exemplary embodiment, similarly to the plurality of low reflection regions 52a of second pattern portion 52, the plurality of low reflection regions 53a are randomly disposed on the circumference centered on rotary axis line A on rotation plate 40.

Fourth pattern portion 54 includes a plurality of low reflection regions 54a. The plurality of low reflection regions 54a are formed of, for example, a coating film having a low reflectance for light from light emitter 14. Fourth pattern portion 54 is used to detect the rotation speed of rotation plate 40. In the present exemplary embodiment, the plurality of low reflection regions 54a have an arc shape extending in the circumferential direction centered on rotary axis line A on rotation plate 40. Each of the plurality of low reflection regions 54a has an arc shape with a central angle of 180 degrees. The number of the plurality of low reflection regions 54a is not particularly limited, but in the present exemplary embodiment, there are four low reflection regions 54a respectively having arc shapes having different radii. Four low reflection regions 54a are disposed at positions different from each other by 90 degrees about rotary axis line A.

[1-3. Configuration of Light Receiving Element]

Figure 4:
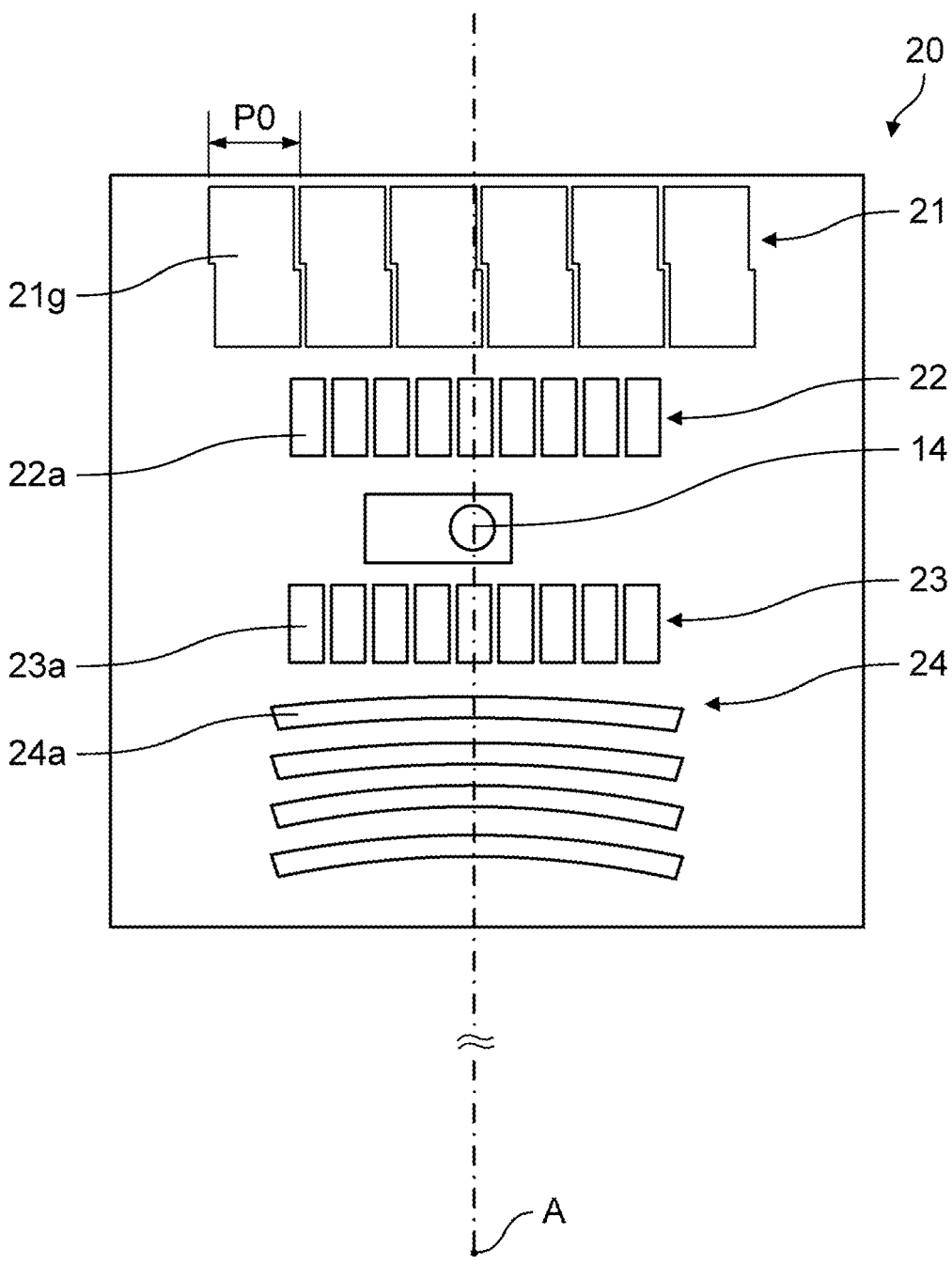
FIG. 4 is a plan view of a light receiving element according to the first exemplary embodiment.

A configuration of light receiving element 20 will be described with reference to FIG. 4. FIG. 4 is a plan view of light receiving element 20 according to the present exemplary embodiment. FIG. 4 is a plan view of a surface of light receiving element 20 facing rotation plate 40 as viewed from a direction along rotary axis line A.

Light receiving element 20 is an element having a plurality of light receivers each of which is a region that detects light. Light receiving element 20 is, for example, a plate-like element having a semiconductor layer. Each of the plurality of light receivers of light receiving element 20 is formed by, for example, adding an impurity to a semiconductor layer. Light receiving element 20 includes increment detector 21. In the present exemplary embodiment, light receiving element 20 further includes first absolute detector 23, second absolute detector 22, and rotation speed detector 24.

Increment detector 21 is a photodetector that outputs a detection signal by an increment method. Increment detector 21 is mainly irradiated with light from light emitter 14 via first pattern portion 51 of rotation plate 40. Increment detector 21 includes a plurality of light receiver groups 21g disposed in a predetermined direction at disposed positions having a constant interval. In the present exemplary embodiment, the plurality of light receiver groups 21g are arranged on the circumference centered on rotary axis line A. A detailed configuration of each of the plurality of light receiver groups 21g will be described later. Note that, in the following description, a placement distance between two adjacent light receiver groups 21g is arrangement interval P0, and a direction in which the plurality of light receiver groups 21g are arranged is referred to as an arrangement direction. The arrangement direction is a direction along a circumference centered on rotary axis line A.

First absolute detector 23 is a detector that outputs a detection signal in an absolute manner. First absolute detector 23 is irradiated with light from light emitter 14 mainly through third pattern portion 53 of rotation plate 40. First absolute detector 23 includes a plurality of first absolute light receivers 23a. The plurality of first absolute light receivers 23a are arranged on a first circumference having a first radius centered on rotary axis line A. The plurality of light receiver groups 21g described above are disposed only on the outer diameter side (that is, the side farther from rotary axis line A with respect to the plurality of first absolute light receiver 23a) of the inner diameter side and the outer diameter side with respect to the plurality of first absolute light receivers 23a. The plurality of light receiver groups 21g are arranged on a second circumference that is concentric with the first circumference of the first radius on which the plurality of first absolute light receivers 23a are arranged and has a second radius larger than the first circumference. The plurality of first absolute light receivers 23a do not overlap with the plurality of light receiver groups 21g.

Second absolute detector 22 is a detector that outputs a detection signal in an absolute manner. Second absolute detector 22 is irradiated with light from light emitter 14 mainly through second pattern portion 52 of rotation plate 40. Second absolute detector 22 includes a plurality of second absolute light receivers 22a. The plurality of second absolute light receivers 22a are arranged on a fourth circumference that is concentric with the first circumference and has a fourth radius larger than the first radius and smaller than the second radius. The plurality of second absolute light receivers 22a do not overlap with the plurality of light receiver groups 21g and the plurality of first absolute light receivers 23a.

Rotation speed detector 24 is a detector that outputs a detection signal corresponding to the rotation speed of rotation plate 40. Rotation speed detector 24 is irradiated with light from light emitter 14 mainly through fourth pattern portion 54 of rotation plate 40. Rotation speed detector 24 includes one or more arc-shaped light receivers 24a. Arc-shaped light receiver 24a is concentric with the first circumference (that is, centered on rotary axis line A), and is disposed on a third circumference having a third radius smaller than the first radius. The width of one or more arc-shaped light receivers 24a in the direction of the third circumference is larger than the width of each of the plurality of first absolute light receivers 23a in the direction of the first circumference. In the present exemplary embodiment, rotation speed detector 24 includes four arc-shaped light receivers 24a having mutually different radii. Four arc-shaped light receivers 24a do not overlap with first absolute light receivers 23a.

In the present exemplary embodiment, light emitter 14 is disposed in light receiving element 20. Light emitter 14 is disposed between first absolute detector 23 and second absolute detector 22.

[1-4. Configuration of Light Receiver Group]

Figure 5:
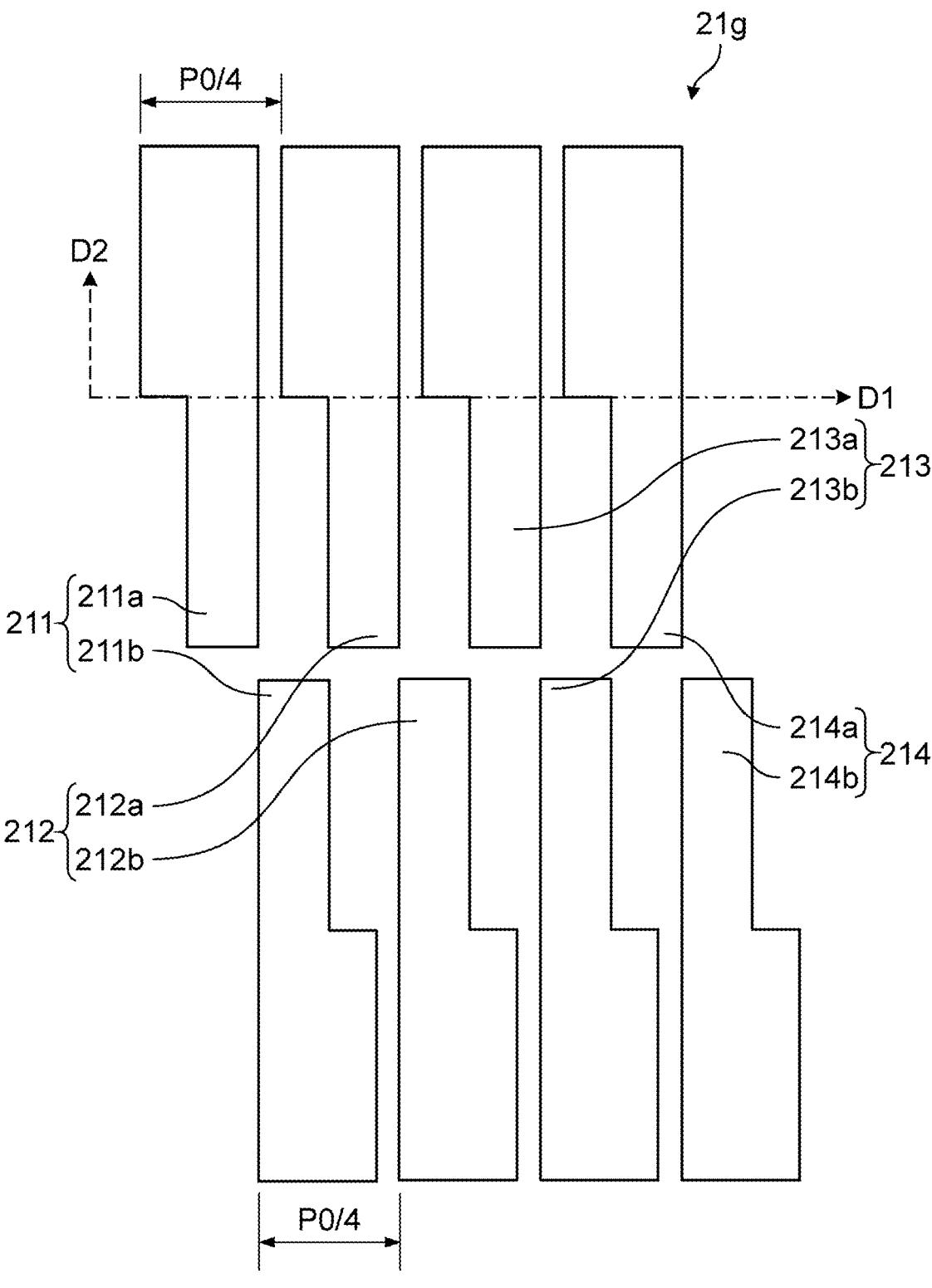
FIG. 5 is a plan view illustrating a configuration of a light receiver group included in the light receiving element according to the first exemplary embodiment.

The plurality of light receiver groups 21g of light receiving element 20 will be described with reference to FIG. 5. FIG. 5 is a plan view illustrating a configuration of light receiver group 21g according to the present exemplary embodiment.

As illustrated in FIG. 5, light receiver group 21g includes first light receiver 211 and second light receiver 212 disposed at a position shifted by ¼ of arrangement interval P0 in the arrangement direction with respect to first light receiver 211. In the present exemplary embodiment, light receiver group 21g further includes third light receiver 213 and fourth light receiver 214. Third light receiver 213 is shifted in the arrangement direction by ½ of arrangement interval P0 with respect to first light receiver 211, and is disposed at a position shifted in the arrangement direction by ¼ of arrangement interval P0 with respect to second light receiver 212. Fourth light receiver 214 is shifted in the arrangement direction by ¾ of arrangement interval P0 with respect to first light receiver 211, and is disposed at a position shifted in the arrangement direction by ¼ of arrangement interval P0 with respect to third light receiver 213. Light receiver groups 21g are irradiated with light from light emitter 14 mainly through first pattern portion 51 of rotation plate 40. The intensity of the light from light emitter 14 is periodically modulated by first pattern portion 51 when rotation plate 40 rotates. Therefore, the intensity of the light applied to light receiver groups 21g varies periodically. The phases of the intensity modulation of the light applied to second light receiver 212, third light receiver 213, and fourth light receiver 214 are shifted by 90 degrees, 180 degrees, and 270 degrees, respectively, from the phase of the intensity modulation of the light applied to first light receiver 211.

First light receiver 211 is separated into first main body portion 211a and first separation portion 211b having a width in arrangement direction D1 of less than ¼ of arrangement interval P0. First main body portion 211a and first separation portion 211b are disposed separately from each other in perpendicular direction D2 perpendicular to arrangement direction D1. In the present exemplary embodiment, arrangement direction D1 is a direction along a circumference centered on rotary axis line A and passing through the plurality of light receiver groups 21g. Perpendicular direction D2 is a radial direction of a circle centered on rotary axis line A.

Second light receiver 212 is separated into second main body portion 212a and second separation portion 212b having a width in arrangement direction D1 less than ¼ of arrangement interval P0, and second main body portion 212a and second separation portion 212b are disposed separately from each other in perpendicular direction D2.

Third light receiver 213 is separated into third main body portion 213a and third separation portion 213b each having a width in arrangement direction D1 of less than ¼ of arrangement interval P0, and third main body portion 213a and third separation portion 213b are disposed separately from each other in perpendicular direction D2.

Fourth light receiver 214 is separated into fourth main body portion 214a and fourth separation portion 214b each having a width in arrangement direction D1 of less than ¼ of arrangement interval P0, and fourth main body portion 214a and fourth separation portion 214b are disposed separately from each other in perpendicular direction D2.

Figure 6:
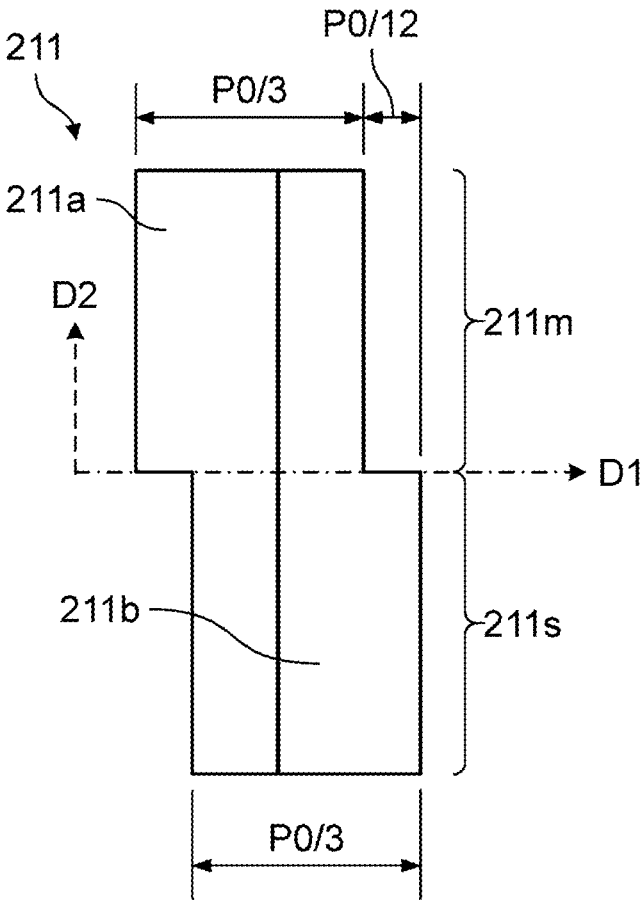
FIG. 6 is a view illustrating a state in which a first main body portion and a first separation portion of a first light receiver included in the light receiving element according to the first exemplary embodiment are disposed on the same circumference.

Here, a configuration of first light receiver 211 will be described with reference to FIG. 6. FIG. 6 is a view illustrating a state in which first main body portion 211a and first separation portion 211b of first light receiver 211 according to the present exemplary embodiment are arranged on the same circumference.

As illustrated in FIG. 6, in a state where first main body portion 211a and first separation portion 211b of first light receiver 211 are arranged on the same circumference, first light receiver 211 includes first main phase portion 211m and first sub-phase portion 211s. First main phase portion 211m has a width of ⅓ of arrangement interval P0 in arrangement direction D1. First sub-phase portion 211s has a width of ⅓ of arrangement interval P0 in arrangement direction D1. In addition, first sub-phase portion 211s is disposed at a position shifted in arrangement direction D1 by 1/12 of arrangement interval P0 with respect to first main phase portion 211m, the position being adjacent to first main phase portion 211m in perpendicular direction D2.

Since first main phase portion 211m of first light receiver 211 has a width of ⅓ of arrangement interval P0 in arrangement direction D1, first main phase portion 211m outputs a trapezoidal wave-shaped periodic signal when rotation plate 40 rotates. Similarly, first sub-phase portion 211s also outputs a trapezoidal wave-shaped periodic signal. In addition, since first sub-phase portion 211s is disposed at the position shifted in arrangement direction D1 by 1/12 of arrangement interval P0 with respect to first main phase portion 211m, the phase of the signal output from first sub-phase portion 211s is shifted by 30 degrees (that is, 360 degrees/12) with respect to the signal output from first main phase portion 211$m$. The signal output from first light receiver 211 is the sum of the signal output from first main phase portion 211$m$ and the signal output from the first sub-phase portion 211$s$. Therefore, the waveform of the signal output from first light receiver 211 is a waveform obtained by combining two trapezoidal waves, and is closer to a sine wave than the trapezoidal wave, that is, a waveform with less distortion.

Similarly to first light receiver 211, second light receiver 212 also includes a second main phase portion and a second sub-phase portion in a state where second main body portion 212$a$ and second separation portion 212$b$ are arranged on the same circumference. The second main phase portion has a width of $\frac{1}{3}$ of arrangement interval P0 in arrangement direction D1. The second sub-phase portion has a width of $\frac{1}{3}$ of arrangement interval P0 in arrangement direction D1. In addition, the second sub-phase portion is disposed at a position shifted in arrangement direction D1 by $\frac{1}{12}$ of arrangement interval P0 with respect to the second main phase portion, the position being adjacent to the second main phase portion in perpendicular direction D2.

Similarly, third light receiver 213 has a third main phase portion and a third sub-phase portion. Similarly, fourth light receiver 214 has a fourth main phase portion and a fourth sub-phase portion.

As a result, each of the plurality of light receiver groups 21$g$ can suppress distortion of the output signal. Therefore, light receiving element 20 can detect the position in the rotation direction of rotation plate 40 with higher accuracy.

In addition, when first main body portion 211$a$ and first separation portion 211$b$ of first light receiver 211 are integrated as illustrated in FIG. 6, in order to arrange first light receiver 211 and second light receiver 212 in arrangement direction D1 so as not to overlap each other, it is necessary to shift the position of second light receiver 212 in arrangement direction D1 to be larger than $\frac{1}{3}$ of arrangement interval P0 with respect to first light receiver 211. Here, in order to cause second light receiver 212 to output a signal whose phase is shifted by 90 degrees with respect to the signal output from first light receiver 211, it is necessary to shift the position of second light receiver 212 by $\frac{5}{4}$ of arrangement interval P0 in arrangement direction D1 with respect to first light receiver 211. Therefore, an unnecessary space in which the light receivers are not disposed over a length of $\frac{11}{12}$ of arrangement interval P0 is generated between first light receiver 211 and second light receiver 212.

In light receiver groups 21$g$ according to the present exemplary embodiment, as described above, first light receiver 211 is separated into first main body portion 211$a$ and first separation portion 211$b$ each having a width in arrangement direction D1 of less than $\frac{1}{4}$ of arrangement interval P0, and first main body portion 211$a$ and first separation portion 211$b$ are disposed separately from each other in perpendicular direction D2. In addition, second light receiver 212 is separated into second main body portion 212$a$ and second separation portion 212$b$ each having a width in arrangement direction D1 of less than $\frac{1}{4}$ of arrangement interval P0, and second main body portion 212$a$ and second separation portion 212$b$ are disposed separately from each other in perpendicular direction D2. As a result, as illustrated in FIG. 5, second main body portion 212$a$ can be disposed at a position shifted from the position of first main body portion 211$a$ by $\frac{1}{4}$ of arrangement interval P0 in arrangement direction D1. In addition, second separation portion 212$b$ can be disposed at a position shifted from the position of first separation portion 211$b$ by $\frac{1}{4}$ of arrangement interval P0 in arrangement direction D1. First main body portion 211$a$ and second main body portion 212$a$ are arranged in arrangement direction D1, and a gap between first main body portion 211$a$ and second main body portion 212$a$ is less than $\frac{1}{4}$ of arrangement interval P0. In addition, first separation portion 211$b$ and second separation portion 212$b$ are arranged in arrangement direction D1, and a gap between first separation portion 211$b$ and second separation portion 212$b$ is less than $\frac{1}{4}$ of arrangement interval P0. Therefore, an unnecessary space between first light receiver 211 and second light receiver 212 can be reduced.

In the present exemplary embodiment, as illustrated in FIG. 5, third light receiver 213 and fourth light receiver 214 also have the configuration similar to that of first light receiver 211 and second light receiver 212. Therefore, third light receiver 213 and fourth light receiver 214 also achieve the effects similar to those of first light receiver 211 and second light receiver 212.

Second Exemplary Embodiment

A light receiving element according to a second exemplary embodiment will be described. The light receiving element according to the present exemplary embodiment is different from light receiving element 20 according to the first exemplary embodiment in the shapes of the main body portion and the separation portion of each light receiver. Hereinafter, the light receiving element according to the present exemplary embodiment will be described with reference to FIG. 7, centering on differences from light receiving element 20 according to the first exemplary embodiment.

Figure 7:
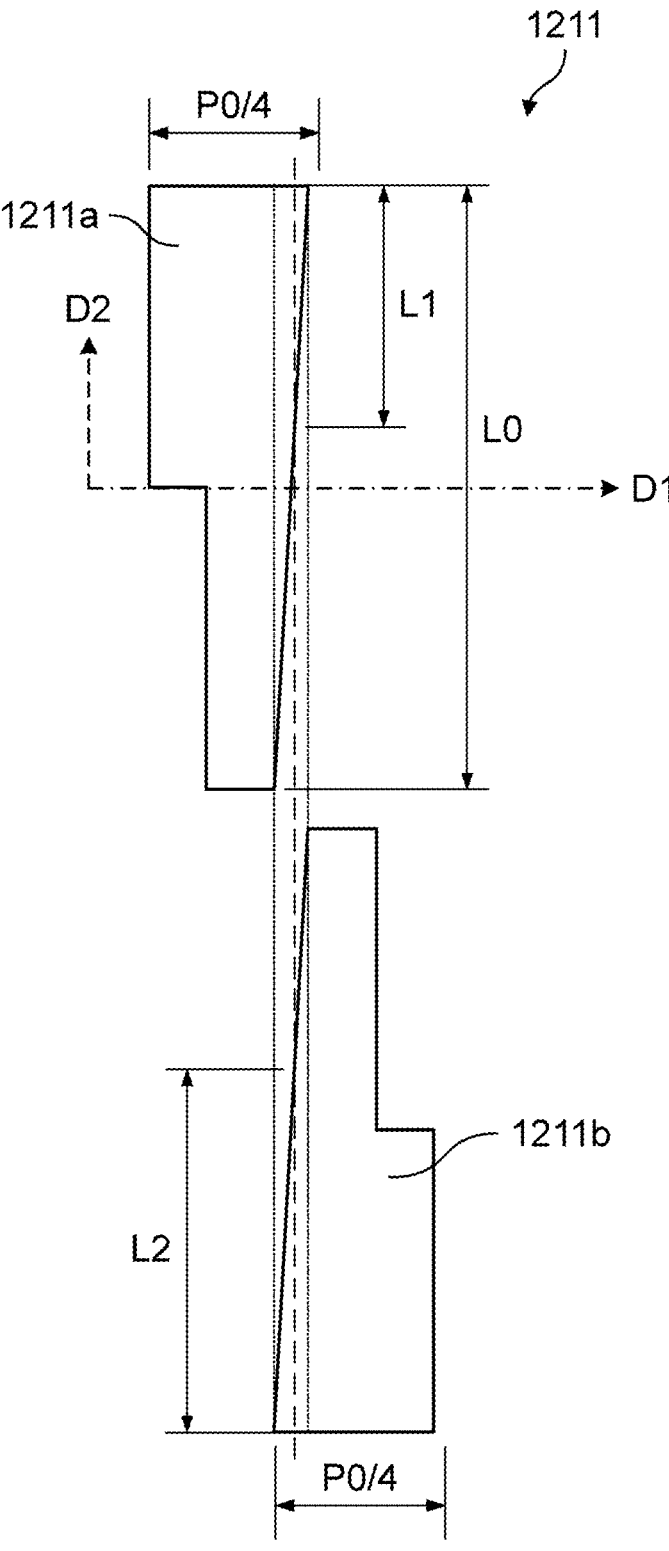
FIG. 7 is a plan view illustrating a configuration of a first light receiver included in a light receiving element according to a second exemplary embodiment.

FIG. 7 is a plan view illustrating a configuration of first light receiver 1211 included in a light receiving element according to the present exemplary embodiment. Each of the plurality of light receiver groups of the light receiving element according to the present exemplary embodiment includes first light receiver 1211 illustrated in FIG. 7. Similarly to first light receiver 211 according to the first exemplary embodiment, first light receiver 1211 is separated into first main body portion 1211$a$ and first separation portion 1211$b$ each having a width in arrangement direction D1 of less than $\frac{1}{4}$ of arrangement interval P0.

In the present exemplary embodiment, each of an end edge of first main body portion 1211$a$ on first separation portion 1211$b$ side (that is, the right side in FIG. 7) and an end edge of first separation portion 1211$b$ on first main body portion 1211$a$ side (that is, the left side in FIG. 7) is inclined with respect to arrangement direction D1 and perpendicular direction D2. The light receiving element including first light receiver 1211 having such a configuration also exerts effects similar to those of light receiving element 20 according to the first exemplary embodiment.

In addition, in the light receiving element according to the present exemplary embodiment, first main body portion 1211$a$ and first separation portion 1211$b$ have an overlapping portion as viewed in perpendicular direction D2. Here, the portion where first main body portion 1211$a$ and first separation portion 1211$b$ overlap as viewed in perpendicular direction D2 is a portion interposed between two dotted lines in FIG. 7. In the present exemplary embodiment, a rectangular light receiver can be formed by combining a portion of first main body portion 1211$a$ overlapping first separation portion 1211$b$ and a portion of first separation portion 1211$b$ overlapping first main body portion 1211$a$ as viewed in perpendicular direction D2. In other words, as viewed in perpendicular direction D2, the sum of the dimension in perpendicular direction D2 of first main body portion 1211*a* and the dimension in perpendicular direction D2 of first separation portion 1211*b* of the portion where first main body portion 1211*a* and first separation portion 1211*b* overlap in arrangement direction D1 is equal to the maximum dimension in perpendicular direction D2 of first main body portion 1211*a*. The dimension in perpendicular direction D2 of first main body portion 1211*a* in the portion where first main body portion 1211*a* and first separation portion 1211*b* overlap each other in arrangement direction D1 as viewed in perpendicular direction D2 is, for example, dimension L1 of a portion where a broken line in FIG. 7 intersects first main body portion 1211*a*. The dimension of first separation portion 1211*b* in perpendicular direction D2 is, for example, dimension L2 of a portion where the broken line in FIG. 7 intersects first separation portion 1211*b*. The maximum dimension of first main body portion 1211*a* in perpendicular direction D2 is, for example, dimension L0 in FIG. 7. That is, L1+L2=L0 is satisfied. Thus, first light receiver 1211 can output a signal similar to that of first light receiver 211 according to the first exemplary embodiment.

When first main body portion 1211*a* and first separation portion 1211*b* are separated as in first light receiver 1211 according to the present exemplary embodiment, the positions of first main body portion 1211*a* and first separation portion 1211*b* in arrangement direction D1 may be slightly shifted due to a manufacturing error or the like. Even in a case where such position deviation occurs, in first light receiver 1211 according to the present exemplary embodiment, first main body portion 1211*a* and first separation portion 1211*b* have an overlapping portion when viewed in perpendicular direction D2, and thus, it is possible to suppress a decrease in the intensity of the output signal when the position in the vicinity of the boundary between first main body portion 1211*a* and first separation portion 1211*b* in arrangement direction D1 is irradiated with light. Therefore, distortion of the output signal of first light receiver 1211 can be suppressed.

Although only first light receiver 1211 has been described for the light receiving element according to the present exemplary embodiment, the second light receiver, the third light receiver, and the fourth light receiver included in the light receiver groups of the light receiving element may also have the configuration similar to that of first light receiver 1211.

Third Exemplary Embodiment

A light receiving element according to a third exemplary embodiment will be described. The light receiving element according to the present exemplary embodiment is different from the light receiving element according to the second exemplary embodiment in the shapes of the main body portion and the separation portion of each light receiver. Hereinafter, the light receiving element according to the present exemplary embodiment will be described with reference to FIG. 8, centering on differences from the light receiving element according to the second exemplary embodiment.

Figure 8:
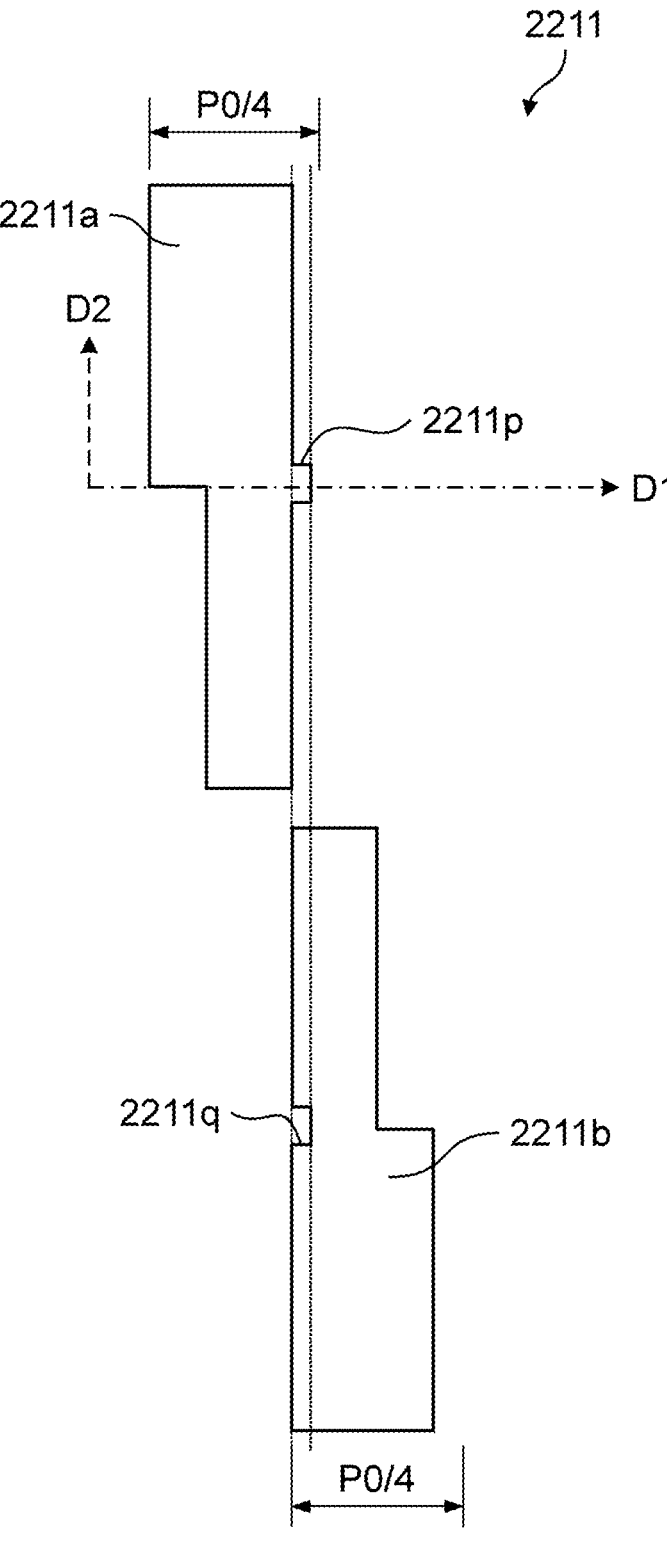
FIG. 8 is a plan view illustrating a configuration of a first light receiver included in a light receiving element according to a third exemplary embodiment.

FIG. 8 is a plan view illustrating a configuration of first light receiver 2211 included in a light receiving element according to the present exemplary embodiment. Each of the plurality of light receiver groups of the light receiving element according to the present exemplary embodiment includes first light receiver 2211 illustrated in FIG. 8. Similarly to first light receiver 1211 according to the second exemplary embodiment, first light receiver 2211 is separated into first main body portion 2211*a* and first separation portion 2211*b* each having a width in arrangement direction D1 of less than ¼ of arrangement interval P0.

In the present exemplary embodiment, first main body portion 2211*a* has protrusion 2211*p* formed at an end edge on first separation portion 2211*b* side (that is, the right side in FIG. 8), and first separation portion 2211*b* has recess 2211*q* formed at an end edge on first main body portion 2211*a* side (that is, the left side in FIG. 8).

In addition, similarly to the light receiving element according to the second exemplary embodiment, also in the light receiving element according to the present exemplary embodiment, first main body portion 2211*a* and first separation portion 2211*b* have an overlapping portion as viewed in perpendicular direction D2. Here, the portion where first main body portion 2211*a* and first separation portion 2211*b* overlap as viewed in perpendicular direction D2 is a portion interposed between two dotted lines in FIG. 8. In the present exemplary embodiment, a rectangular light receiver can be formed by combining a portion of first main body portion 2211*a* overlapping first separation portion 2211*b* and a portion of first separation portion 2211*b* overlapping first main body portion 2211*a* as viewed in perpendicular direction D2. That is, recess 2211*q* and protrusion 2211*p* have the same shape and the same size. Therefore, the area of recess 2211*q* is equal to the area of protrusion 2211*p*. Thus, first light receiver 2211 can output a signal similar to that of first light receiver 211 according to the first exemplary embodiment.

Note that, in the present exemplary embodiment, first main body portion 2211*a* has protrusion 2211*p*, and first separation portion 2211*b* has recess 2211*q*. However, the configuration of first light receiver 2211 is not limited thereto. For example, first main body portion may have a recess formed at an end edge on the first separation portion side, and the first separation portion may have a recess formed at an end edge on the first main body portion side.

In addition, although only first light receiver 2211 has been described for the light receiving element according to the present exemplary embodiment, the second light receiver, the third light receiver, and the fourth light receiver included in the light receiver groups of the light receiving element may also have the configuration similar to that of first light receiver 2211.

Fourth Exemplary Embodiment

A light receiving element according to a fourth exemplary embodiment will be described. The light receiving element according to the present exemplary embodiment is different from the light receiving element according to the third exemplary embodiment in the positional relationship between the protrusion and the recess. Hereinafter, the light receiving element according to the present exemplary embodiment will be described with reference to FIG. 9, centering on differences from the light receiving element according to the third exemplary embodiment.

Figure 9:
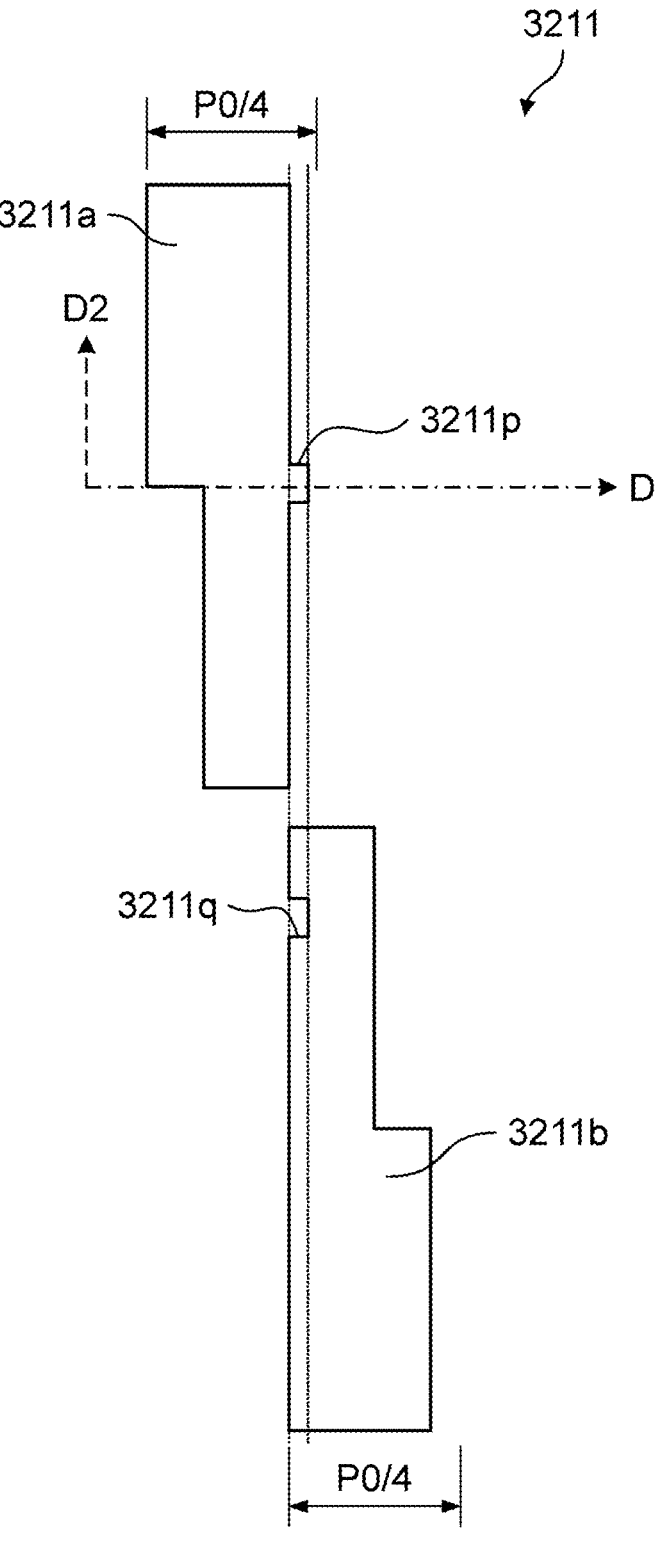
FIG. 9 is a plan view illustrating a configuration of a first light receiver included in a light receiving element according to a fourth exemplary embodiment.

FIG. 9 is a plan view illustrating a configuration of first light receiver 3211 included in the light receiving element according to the present exemplary embodiment. As illustrated in FIG. 9, each of the plurality of light receiver groups of the light receiving element according to the present exemplary embodiment includes first light receiver 3211. Similarly to first light receiver 2211 according to the third exemplary embodiment, first light receiver 3211 is separated into first main body portion 3211*a* and first separation portion 3211*b* each having a width in arrangement direction D1 of less than ¼ of arrangement interval P0.

In the present exemplary embodiment, first main body portion 3211*a* has protrusion 3211*p* formed at an end edge on the first separation portion 3211*b* side (that is, the right side in FIG. 9), and first separation portion 3211*b* has recess 3211*q* formed at an end edge on the first main body portion 3211*a* side (that is, the left side in FIG. 9).

In addition, similarly to the light receiving element according to the third exemplary embodiment, also in the light receiving element according to the present exemplary embodiment, first main body portion 3211*a* and first separation portion 3211*b* have an overlapping portion as viewed in perpendicular direction D2. Here, the portion where first main body portion 3211*a* and first separation portion 3211*b* overlap as viewed in perpendicular direction D2 is a portion interposed between two dotted lines in FIG. 9.

In the present exemplary embodiment, a rectangular light receiver cannot be formed even when a portion of first main body portion 3211*a* overlapping first separation portion 3211*b* and a portion of first separation portion 3211*b* overlapping first main body portion 3211*a* are combined as viewed in perpendicular direction D2. That is, the position of protrusion 3211*p* in perpendicular direction D2 does not correspond to the position of recess 3211*q* in perpendicular direction D2. However, recess 3211*q* and protrusion 3211*p* have the same shape and the same size. Therefore, the area of recess 3211*q* is equal to the area of protrusion 3211*p*. First light receiver 3211 having such protrusion 3211*p* and recess 3211*q* also exerts the effects similar to those of first light receiver 2211 according to the third exemplary embodiment.

Note that recess 3211*q* and protrusion 3211*p* do not necessarily have the same shape and the same size as long as having the equal areas. For example, in the example illustrated in FIG. 9, recess 3211*q* and protrusion 3211*p* have rectangular shapes, but these shapes are not limited to the rectangular shapes. For example, recess 3211*q* may have a rectangular shape, and protrusion 3211*p* may have a parallelogram shape or the like. As described above, it is sufficient that, when first main body portion 3211*a* and first separation portion 3211*b* are arranged in arrangement direction D1, first main body portion 3211*a* and first separation portion 3211*b* are configured such that the outer shapes are equal and the total area of first main body portion 3211*a* and first separation portion 3211*b* is equal.

Note that, in the present exemplary embodiment, first main body portion 3211*a* has protrusion 3211*p*, and first separation portion 3211*b* has recess 3211*q*. However, the configuration of first light receiver 3211 is not limited thereto. For example, first main body portion may have a recess formed at an end edge on the first separation portion side, and the first separation portion may have a recess formed at an end edge on the first main body portion side.

In addition, although only first light receiver 3211 has been described for the light receiving element according to the present exemplary embodiment, the second light receiver, the third light receiver, and the fourth light receiver included in the light receiver groups of the light receiving element may also have the configuration similar to that of first light receiver 3211.

Modification

Although the light receiving elements and the rotation detectors according to the present disclosure have been described above based on the exemplary embodiments, the present disclosure is not limited to the exemplary embodiments described above.

For example, in each of the above exemplary embodiments, rotation plate 40 includes the pattern portion that reflects a part of the light from light emitter 14, but the configuration of the pattern portion is not limited thereto. For example, the pattern portion may be a slit or the like that transmits a part of the light from light emitter 14. In this case, a rotation plate is disposed between light emitter 14 and light receiver.

In each of the above exemplary embodiments, the plurality of light receiver groups of the light receiving element are arranged on the circumference centered on rotary axis line A, and the rotation amount of the rotation plate is detected. However, the configuration of the plurality of light receiver groups is not limited to this. For example, the plurality of light receiver groups and the plurality of low reflection regions of the first pattern portion may be arranged on a straight line to constitute a linear displacement detector (encoder).

The present disclosure also includes embodiments resulting from various changes made to the above-described exemplary embodiments by those skilled in the art, as well as embodiments made by any combination of constituent elements and functions of the exemplary embodiments without departing from the spirit of the present disclosure.

INDUSTRIAL APPLICABILITY

The technology of the present disclosure can be used for a rotation detector that detects a rotation amount of an electric motor or the like, a linear displacement detector that detects displacement of a moving stage that is linearly driven, or the like.

The invention claimed is:

1. A light receiving element comprising a plurality of light receiver groups arranged in a predetermined arrangement direction at a predetermined arrangement interval, wherein:

each of the plurality of light receiver groups includes a first light receiver and a second light receiver disposed at a position shifted by ¼ of the arrangement interval in the arrangement direction with respect to the first light receiver, the first light receiver includes a first doped semiconductor layer to detect light, and includes:

a first main phase portion that has a width of ⅓ of the arrangement interval in the arrangement direction, a first sub-phase portion that has a width of ⅓ of the arrangement interval in the arrangement direction and is disposed at a position shifted in the arrangement direction by 1/12 of the arrangement interval with respect to the first main phase portion so as to generate a signal shifted by 30 degrees with respect to a signal generated by the first main phase portion, the position being adjacent to the first main phase portion in a perpendicular direction perpendicular to the arrangement direction, the first main phase portion and the first sub-phase portion are formed in the first doped semiconductor layer, the second light receiver includes a second doped semiconductor layer to detect light, and includes:

a second main phase portion that has a width of ⅓ of the arrangement interval in the arrangement direction, a second sub-phase portion that has a width of ⅓ of the arrangement interval in the arrangement direction and is disposed at a position shifted in the arrangement direction by ¹⁄₁₂ of the arrangement interval with respect to the second main phase portion so as to generate a signal shifted by 30 degrees with respect to a signal generated by the second main phase portion, the position being adjacent to the second main phase portion in the perpendicular direction, the second main phase portion and the second sub-phase portion are formed in the second doped semiconductor layer, the first light receiver is separated into a first main body portion and a first separation portion each having a width in the arrangement direction of less than ¼ of the arrangement interval, the first main body portion and the first separation portion being disposed separately from each other in the perpendicular direction, the second light receiver is separated into a second main body portion and a second separation portion each having a width in the arrangement direction of less than ¼ of the arrangement interval, the second main body portion and the second separation portion being disposed separately from each other in the perpendicular direction, the first main body portion and the second main body portion are arranged in the arrangement direction and has a gap between the first main body portion and the second main body portion of less than ¼ of the arrangement interval, and the first separation portion and the second separation portion are arranged in the arrangement direction and has a gap between the first separation portion and the second separation portion of less than ¼ of the arrangement interval.

2. The light receiving element according to claim 1, wherein the first main body portion and the first separation portion have an overlapping portion as viewed in the perpendicular direction.

3. The light receiving element according to claim 2, wherein each of an end edge of the first main body portion on the first separation portion side and an end edge of the first separation portion on the first main body portion side is inclined with respect to the arrangement direction and the perpendicular direction.

4. The light receiving element according to claim 2, wherein the first main body portion has a protrusion formed at the end edge on the side of the first separation portion, and the first separation portion has a recess formed at the end edge on the side of the first main body portion.

5. The light receiving element according to claim 2, wherein the first main body portion has a recess formed at the end edge on the side of the first separation portion, and the first separation portion has a protrusion formed at the end edge on the side of the first main body portion.

6. The light receiving element according to claim 4, wherein an area of the recess is equal to an area of the protrusion.

7. The light receiving element according to claim 4, wherein the recess and the protrusion have a same shape and a same size.

8. The light receiving element according to claim 2, wherein a rectangular light receiver is formed by combining a portion of the first main body portion overlapping the first separation portion and a portion of the first separation portion overlapping the first main body portion as viewed in the perpendicular direction.

9. The light receiving element according to claim 2, wherein, as viewed in the perpendicular direction, a sum of a dimension in the perpendicular direction of the first main body portion and a dimension in the perpendicular direction of the first separation portion at a position in the arrangement direction where the first main body portion and the first separation portion overlap is equal to a maximum dimension in the perpendicular direction of the first main body portion.

10. A rotation detector comprising:

the light receiving element according to claim 1;

a light emitter that emits light; and a rotation plate disposed at a position facing the light receiving element, the light being emitted to the plurality of light receiver groups via the rotation plate.

* * * * *